US007612513B2

(12) United States Patent
Ando et al.

(10) Patent No.: US 7,612,513 B2
(45) Date of Patent: Nov. 3, 2009

(54) CONTROL DEVICE EQUIPPED WITH MOTOR PROTECTION FUNCTION

(75) Inventors: Toru Ando, Aichi (JP); Tomohisa Kameyama, Aichi (JP)

(73) Assignee: Okuma Corporation, Aichi (JP)

( * ) Notice: Subject to any disclaimer, the term of this patent is extended or adjusted under 35 U.S.C. 154(b) by 124 days.

(21) Appl. No.: 11/837,020

(22) Filed: Aug. 10, 2007

(65) Prior Publication Data

US 2008/0054833 A1 Mar. 6, 2008

(30) Foreign Application Priority Data

Aug. 29, 2006 (JP) ............................. 2006-232066

(51) Int. Cl.
*H02K 17/32* (2006.01)
(52) U.S. Cl. ........................ 318/434; 318/471; 318/635
(58) Field of Classification Search ................. 318/434, 318/471, 635, 782, 783, 400.21, 400.22; 361/23, 30; 388/903, 934
See application file for complete search history.

(56) References Cited

U.S. PATENT DOCUMENTS

2004/0264073 A1* 12/2004 Zocholl ....................... 361/23

FOREIGN PATENT DOCUMENTS

| JP | 6253577 | 9/1994 |
|---|---|---|
| JP | 9261850 | 10/1997 |

* cited by examiner

*Primary Examiner*—Karen Masih
(74) *Attorney, Agent, or Firm*—Gauthier & Connors LLP

(57) ABSTRACT

A synchronous motor control device having an optimal protection function in accordance with an operational state of a motor is provided.

The motor control device includes a position detecting sensor detecting an angular position of a motor, a speed controller controlling the speed of the motor based on the angular position of the motor detected by the position detecting sensor, a temperature estimation component that estimates the temperature of the motor from a current command value calculated by the speed controller or a torque command value and, when the estimated temperature reaches a threshold, outputs a current cutoff signal to a current controller that cuts off passage of current to the motor, and an operational state determination part determining an operational state of the motor based on the angular position of the motor detected by the position detecting sensor, wherein the temperature estimation component changes the threshold based on the operational state of the motor determined by the operational state determination component.

3 Claims, 5 Drawing Sheets

CONTROL DEVICE EQUIPPED WITH MOTOR PROTECTION FUNCTION

CROSS-REFERENCE TO RELATED APPLICATIONS

This application claims priority to Japanese Patent Application No. 2006-232066, filed on Aug. 29, 2006, which is incorporated herein by reference in its entirety.

BACKGROUND OF THE INVENTION

1. Field of Invention

The present invention relates to a motor control device, and, in particular, relates to a motor control device having an optimal protection function in accordance with an operational state of a motor.

2. Description of the Related Art

If, when operating a motor, an overloaded state continues, the temperature of motor windings may continue to rise, possibly leading to burning out of the motor windings. In consideration of this possibility, thermal protection devices which use a temperature gauge, such as a thermostat or thermistor embedded in the motor winding, to cut off the flow of current to the motor when the temperature rises have come to be used.

Additionally, an electronic thermal system in which no temperature detector is used, such as that disclosed by Japanese Patent Application Laid-Open No. 9-261850 or Japanese Patent Application Laid-Open No. 6-253577, can be used. Such a system is intended to thermally protect heat-generating components having a thermal time constant of several seconds or more and their surroundings, and protects objects to be protected by calculating a heating value and a heat release amount to estimate the temperature based on a history of current commands or the like.

FIG. 5 is a block diagram of an example motor control device to which an electronic thermal system is applied. A motor 44 is controlled based on a speed command V* calculated by a high-level controller (such as position control), not shown in FIG. 5. A flow of control will be described below.

A speed controller 41 receives a speed feedback V calculated by a converter 46 using a position detected value of an encoder 45 and the speed command V* as input to perform operations such as PI control and calculate a current command I*. Next, a current controller 42 receives a current feedback I and the current command I* to calculate an inverter drive command. Based on the inverter drive command, an inverter circuit 43 outputs power waveforms to drive the motor 44. Also, based on the current command I*, a temperature estimation component 47 estimates the temperature. If the estimated temperature reaches a threshold, the temperature estimation part 47 outputs an operation stop command of the motor 44 to the current controller 42.

In a system using the thermal protection device described above, it is assumed that the temperature detected by a thermistor or a thermostat used as a temperature detector accurately reflects the temperature of the motor winding itself. Thus, if there is a temperature difference between the temperature detector and motor winding, the protection function will not work properly. Also, if motor rotation is frozen as a result, for example, a collision, current may be concentrated on one phase, causing the temperature of a portion of the motor winding to rise. As a result, a temperature difference arises between the portion of the motor winding where the temperature rises and the temperature detector, such that the temperature detector cannot detect the temperature of the motor winding correctly, possibly leading to burning out of the motor winding. Further, if thermal conduction from the motor winding to the temperature detector is poor or the thermal time constant of the motor winding is smaller than the detection delay of the temperature detector, the temperature detector cannot detect the temperature of the motor winding correctly, in which case it may not be possible to prevent burning out, or possible actual combustion, of the motor winding.

In a conventional electronic thermal system described above, because, when the motor is rotating, current flows equally in three phases (U phase, V phase, and W phase) and the temperature of the motor winding rises as a whole, the temperature estimation component 47 can accurately estimate the temperature of the motor winding. A motor protection curve in this case looks like the curve shown in FIG. 4. Here, M4, A4, and T4 in FIG. 4 are values determined by the motor. Here, the value M4 is a motor current limiting value, the value 4 is typically set to the motor continuous rating current, and the value T4 is set depending on the motor. For example, the protection curve may be determined based on an actually measured thermal time constant when the motor is rotating at a continuous rated power. However, if the motor is locked, current concentrates in one phase to raise the temperature of a portion of the motor winding, leading to burning out of the motor winding. Thus, it is necessary to reexamine (lower) the threshold to prevent burning out of the motor winding when the motor is locked. However, if the threshold is lowered and the motor is rotating, the estimated temperature value may exceed the threshold even when the motor is operating normally, causing a problem of unnecessary activation of the protection function.

Moreover, in the electronic thermal system, the estimated value of temperature of the motor winding is the same for all three phases regardless of the operational state of motor. If, at this point, current concentrates in one phase, the temperature of the motor winding deviates from the estimated value of temperature, causing a problem of burning out of the motor winding before activating the protection function.

The present invention was made to solve the above problems, and an object thereof is to provide an optimal motor protection function.

SUMMARY OF THE INVENTION

The present invention advantageously solves the problems of the above conventional examples by providing a motor control device that includes a position detecting sensor detecting an angular position of a motor, a speed controller controlling the speed of the motor based on the angular position of the motor detected by the position detecting sensor, a temperature estimation part that estimates the temperature of the motor from a current command value calculated by the speed controller or a torque command value and, when the estimated temperature reaches a threshold, outputs a current cutoff signal to a current controller that cuts off passage of current to the motor, and an operational state determination part determining an operational state of the motor based on the angular position of the motor detected by the position detecting sensor, wherein the temperature estimation component changes the threshold based on the operational state of the motor determined by the operational state determination part.

The present invention may also be configured as a motor control device that includes a position detecting means for detecting an angular position of a motor, a speed control means for controlling the speed of the motor based on the angular position of the motor detected by the position detecting means, a temperature estimation means for estimating the temperature of the motor from a current command value calculated by the speed control means or a torque command value, a current control means for cutting off passage of current to the motor when the temperature of the motor estimated by the temperature estimation means reaches a threshold, an operational state determination means for determining an operational state of the motor based on the angular position of the motor detected by the position detecting means, and a threshold change means for changing the threshold based on the operational state of the motor determined by the operational state determination means.

Also in the motor control device of the present invention, the operational state determination means may determine that the motor is in a locked state when the angular position of the motor detected by the position detecting means does not change and that the motor is rotating when the angular position of the motor changes, and the threshold change means sets the threshold as a first threshold when it is determined by the operational state determination means that the motor is rotating and sets the threshold as a second threshold, which is smaller than the first threshold, when it is determined by the operational state determination means that the motor is in a locked state.

The present invention also provides a motor control method that includes a position detecting process for detecting an angular position of a motor, a speed control process for controlling the speed of the motor based on the angular position of the motor detected by the position detecting process, a temperature estimation process for estimating the temperature of the motor from a current command value calculated by the speed control process or a torque command value, a current control process for cutting off passage of current to the motor when the temperature of the motor estimated by the temperature estimation process reaches a threshold, an operational state determination process for determining an operational state of the motor based on the angular position of the motor detected by the position detecting process, and a threshold change process for changing the threshold based on the operational state of the motor determined by the operational state determination process.

In the motor control method of the present invention, the operational state determination process may determine that the motor is in a locked state when the angular position of the motor detected by the position detecting process does not change and that the motor is rotating when the angular position of the motor changes, and the threshold change process sets the threshold as a first threshold when it is determined by the operational state determination process that the motor is rotating and sets the threshold as a second threshold, which is smaller than the first threshold, when it is determined by the operational state determination process that the motor is in a locked state.

By application of the present invention, a motor control device that can activate an optimal protection function in accordance with an operational state of a motor can be provided.

DETAIL DESCRIPTION OF PREFERRED
EMBODIMENT OF THE INVENTION

Figure 1:
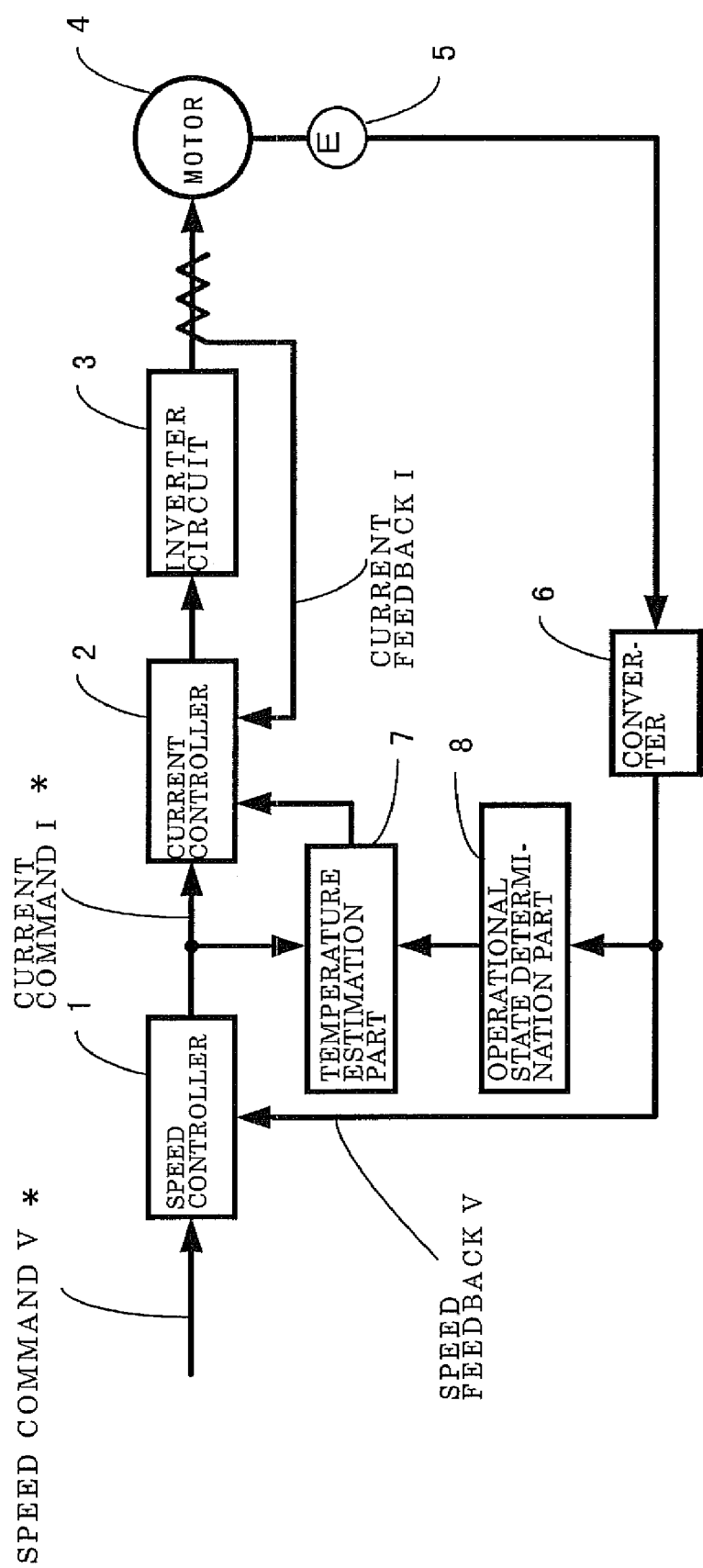
FIG. 1 is a block diagram showing a control block in a motor control device having a protection function according to an embodiment of the present invention.
Figure 2:
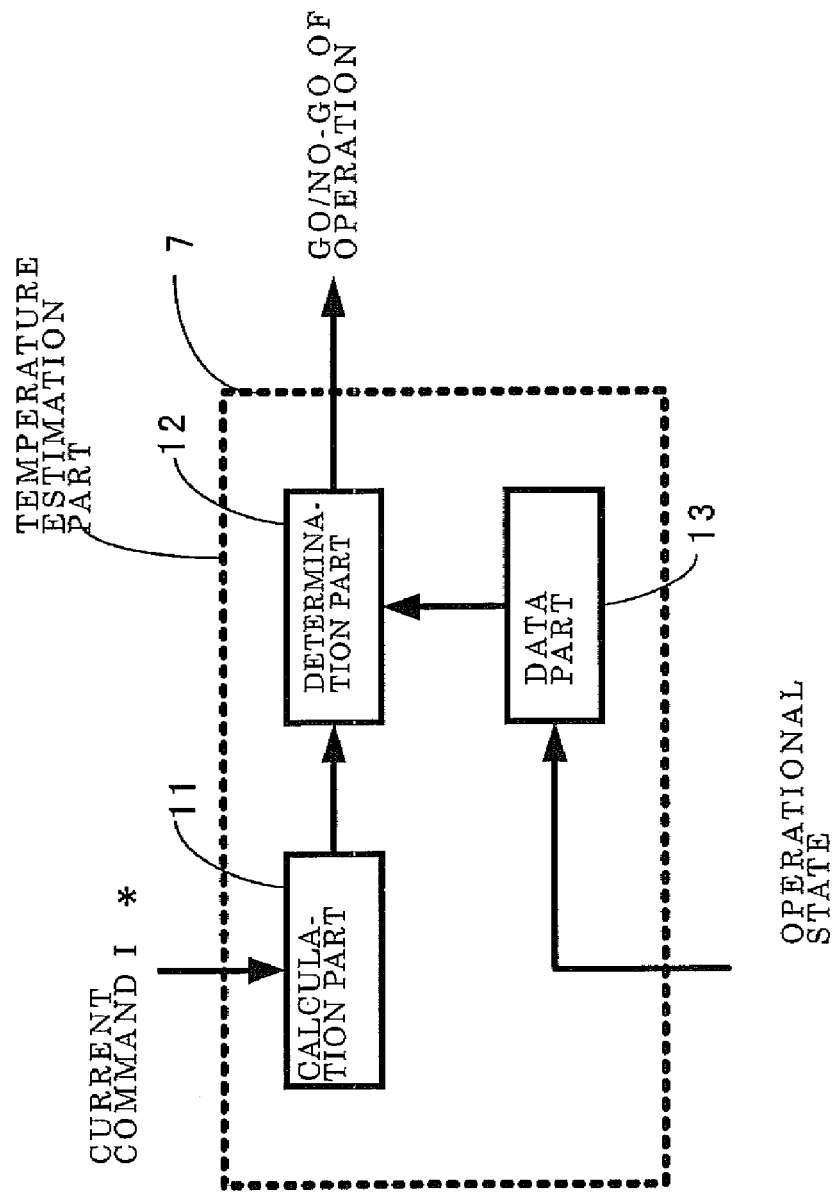
FIG. 2 is a block diagram showing details of a temperature estimation part in the motor control device in the embodiment of the present invention.

An embodiment of the present invention applied to a motor control device will be described with reference to FIG. 1 and FIG. 2. FIG. 1 is a block diagram showing a control block in a motor control device having the protection function according to the present invention. FIG. 2 is a block diagram showing details of a temperature estimation component.

First, operations of the motor control device having the protection function will be described with reference to FIG. 1. A speed controller 1 receives a speed feedback V calculated by a converter 6 from a position detected value of an encoder 5, which is a position detecting means for detecting the position of a motor, and a speed command V* as input to perform operations such as PI control and calculates a current command I*. In FIG. 1, output of the speed controller 1 is made into the current command I*, but a similar function can also be realized by using a torque command, which is proportional to the current command I*. The present invention will be described below by using the current command I*. A current controller 2 receives a current feedback I and the current command I* as input to calculate an inverter drive command. Based on the inverter drive command from the current controller 2, an inverter circuit 3 converts a drive current of a motor 4. Based on the position detected value of the encoder 5 converted by the converter 6, an operational state determination component 8 determines an operational state of the motor 4. The operational state determination component 8 determines that the motor 4 is in a locked state when the position detected value of the encoder 5 converted by the converter 6 does not change and that the motor 4 is rotating when the position detected value changes. The operational state determination component 8 outputs an operational state determination signal of the motor 4 to a temperature estimation component 7. The temperature estimation component 7 has a temperature estimation means for calculating an estimated value of temperature based on the current command I* and a threshold change means for changing the threshold based on the operational state determination signal of the motor 4 output from the operational state determination part 8. The threshold change means sets the threshold as a first threshold when it is determined that the motor 4 is rotating and sets that threshold as a second threshold, which is smaller than the first threshold, when it is determined that the motor 4 is in a locked state. Here, if the estimated temperature value reaches the threshold, the temperature estimation component 7 outputs to the current controller 2 a command to cut off passage of current to the motor 4 to stop the operation of the motor 4. In such a case, the temperature estimation component 7 outputs a command to cut off flow of current to the motor 4 to the current controller 2, but the temperature estimation component 7 can also output a command to cut off flow of current to the motor 4 to the speed controller 1 that calculates the current command I*.

Next, processing in the temperature estimation component 7 will be described in detail with reference to FIG. 2. The temperature estimation component 7 includes a calculation component 11, a determination component 12, and a data component 13. The calculation component 11 has the temperature estimation means for calculating an estimated value of temperature from the current command I*. The data component 13 has the threshold change means for changing the threshold based on the operational state determination signal output from the operational state determination part 8. The determination part 12 compares the estimated value of temperature and the threshold to output a command signal of go/no-go of operation (operation continuation or operation stop) to the current controller 2.

Figure 3:
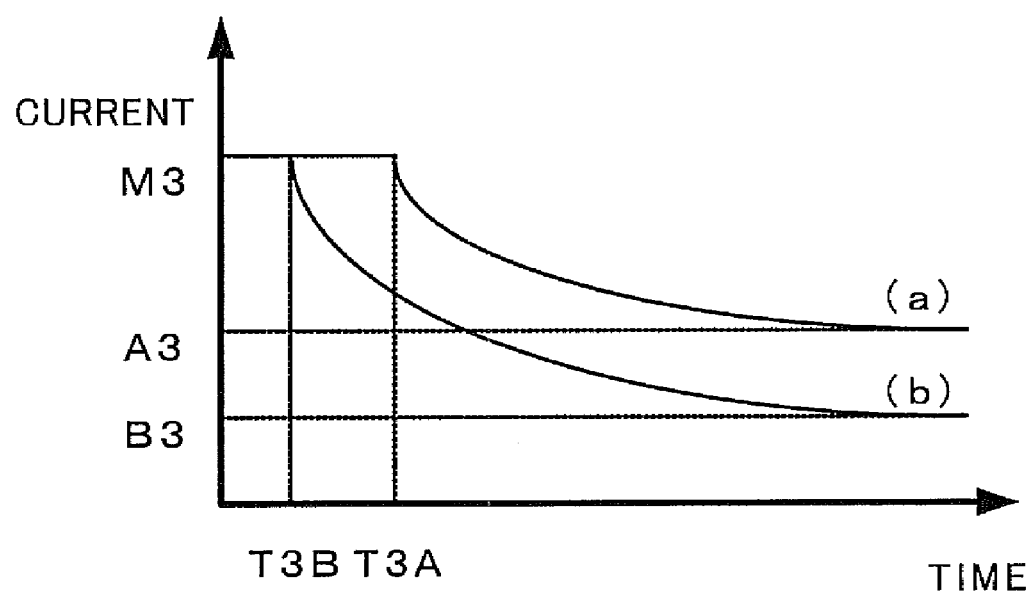
FIG. 3 is a diagram showing an example of protection curves used by the temperature estimation part in the motor control device in the embodiment of the present invention.
Figure 4:
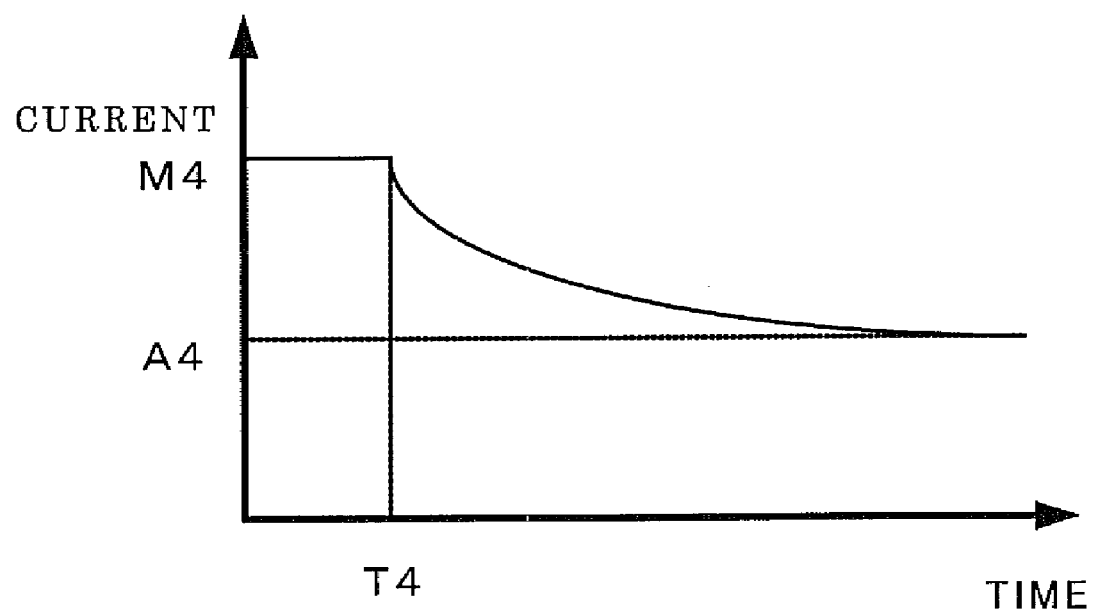
FIG. 4 is a diagram showing an example of protection curves of a conventional motor.
Figure 5:
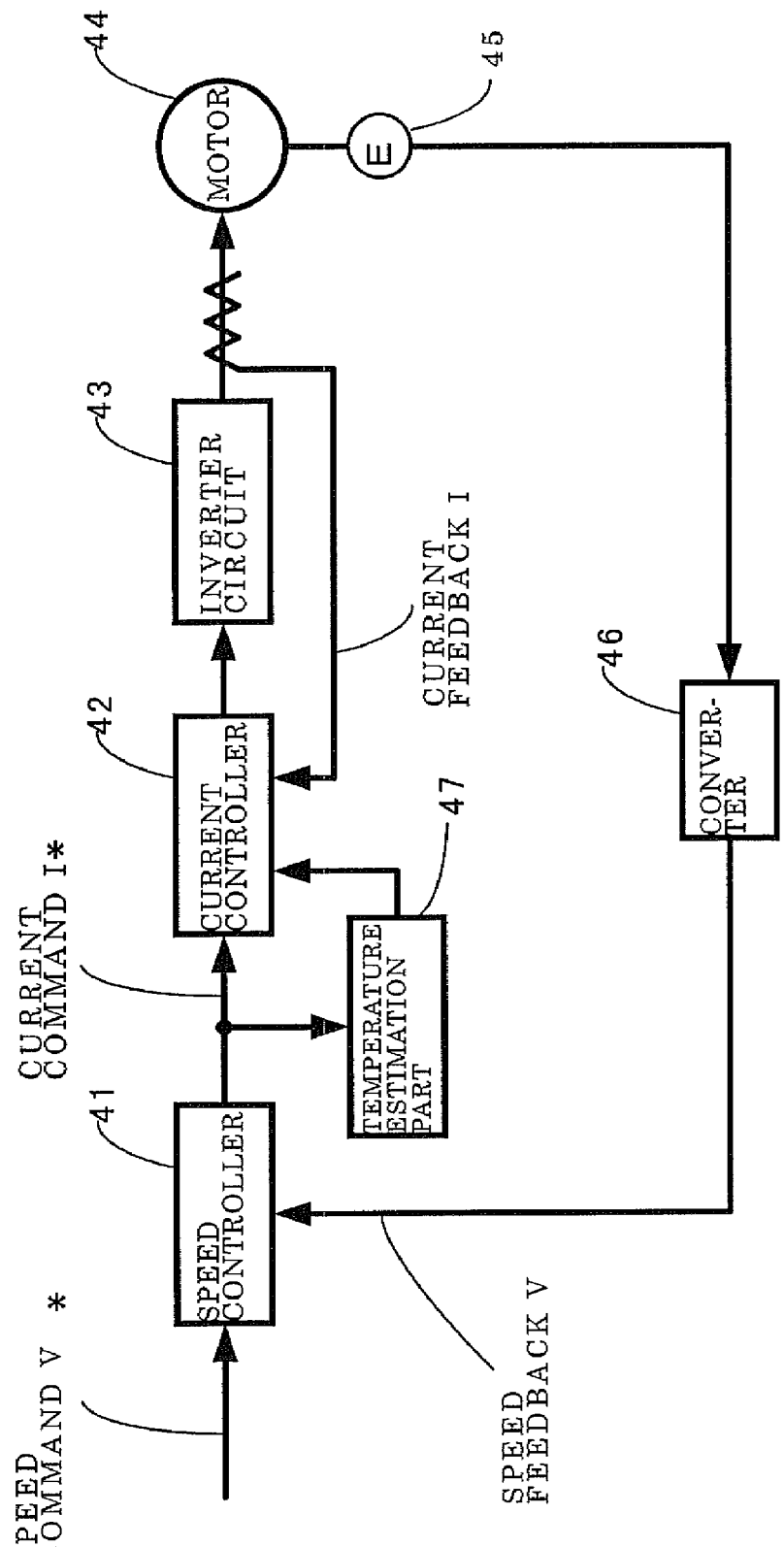
FIG. 5 is a block diagram showing the control block in a motor control device having the protection function by a conventional electronic thermal system.

Here, the data component 13 will be described in detail below. The data for the protection curves shown in FIG. 3 is stored in the data component 13. Here, (a) shows a protection curve of a motor rotating state, that is, when current phases rotate and (b) shows a protection curve of a motor locked state, that is, when current phases are locked. Symbols (M3, A3, B3, T3A, and T3B) in FIG. 3 are values determined by the motor. For example, M3 is a motor current limiting value, A3 is a motor continuous rating current value, and B3 is $1/\sqrt{2}$ of the motor continuous rating current value. When current phases are locked, a current flows as a direct current and the calorific value of a motor is proportional to the square of current and therefore, the current producing the same calorific value as that of current when current phases rotate becomes $1/\sqrt{2}$. Thus, from the viewpoint of motor protection, the value of current that can continuously be passed when current phases are locked becomes $1/\sqrt{2}$ of the motor continuous rating current value. Furthermore, examples of settings of T3A and T3B include T3A set prior to the temperature rising by 100° C. when the motor current limiting value is continuously passed for under the condition that the current phases are rotating, and T3B set as the time until the temperature rises by 100° C. when the motor current limiting value is continuously passed for under the condition that motor is locked.

Further, how to calculate an estimated value of temperature in the calculation part 11 will be described in detail below. By considering an equivalent circuit for an object to be protected, the electronic thermal calculation method is determined. Various methods can be considered for the calculation like the protection curve and an example will be shown below.

If the temperature rise at any given time is T[n], the last temperature rise is T[n−1], the current is i[n], and A and β are constants of proportionality, the following relation holds:

$$T[n]=\beta\{A\cdot i[n]-T[n-1]\}+T[n-1] \quad \text{Formula (1)}$$

where β in Formula 1 is in the range 0<β<1.
From Formula 1, $$T[n]-A\cdot i[n]=(1-\beta)\{T[n-1]-A\cdot i[n]\}$$

holds, giving:

$$T[n]-A\cdot i[n]=(1-\beta)^n\{T[0]-A\cdot i[n]\}$$

Here, since it is considered, based on Formula 1, that T[0]=0, the temperature rise T[n] when a constant current i continuously flows is given by:

$$T[n]=A\{1-(1-\beta)^n\}\cdot i \quad \text{Formula (2)}$$

If, in Formula 2, n→∞, since 0<(1−β)<1

$$T[n]_{n\to\infty}=A\cdot i$$

If the current i at this point is a continuous current ic, and ic and i are represented as a ratio to a current limiting value IL, a conditional expression for a protection area by the electronic thermal system is given as:

$$A\cdot ic<A\{1-(1-\beta)^n\}\cdot i=T[n] \quad \text{Formula (3)}$$

Dividing both sides by A·IL gives $$ic/IL<\{1-(1-\beta)^n\}\cdot i/IL=T[n]/(A\cdot IL) \quad \text{Formula (4)}$$

Substituting θ[n]=T[n]/A·IL) and γ=ic/IL into Formula 4 gives $$\gamma=ic/IL<A\{1-(1-\beta)^n\}\cdot i/IL=\theta[n] \quad \text{Formula (5)}$$

Formula (1) gives $$\theta[n]=\beta\{i[n]/IL-\theta[n-1]\}+\theta[n-1] \quad \text{Formula (6)}$$

θ[n] in Formula 6 represents an estimated value of temperature and, from Formula 5 and Formula 6, constants to determine a protection curve based on the estimated value of temperature are γ and β. Here, γ is a constant representing a continuous current when the current limiting value is set to 1, and β means the time constant of a protection curve. If, for example, the object to be protected is a motor, the calorific value of the motor is proportional to the square of the current, and, thus, an estimated value of temperature will be calculated from the square of the current. That is, the estimated value of temperature is calculated by changing i[n]/IL in Formula (6) to (i[n]/IL)². In other words, the estimated value of temperature must be calculated by considering what the calorific value of an object to be protected is proportional to.

In the detailed description above of the data part 13, changing the protection curve in accordance with the operational state has been described. Also, the estimated value of temperature can be changed when the operational state changes (current phases rotating↔current phases locked). An example of change content will be described below.

Because the estimated value of temperature of a motor is calculated using the square of current, it is possible to consider that the estimated value of temperature is approximately equal to the squared current (≅current²). If the value of current that can continuously flow when current phases are rotating is Im, the current value that can continuously flow when current phases are locked become $Tm/\sqrt{2}$. Here, if the estimated value of temperature when current phases are locked and that when current phases are rotating are $T_R$ and $T_L$ respectively, the following relational expression holds true:

$$T_L \cong (Im/\sqrt{2})^2 = Im^2/2 \cong T_R/2 \quad \text{Formula (7)}$$

From the relational expression of Formula (7), it is clear that the estimated value of temperature is halved when the operational state changes from rotating current phases to locked current phases, and the estimated value of temperature is doubled when the operational state changes from locked current phases to rotating current phases.

What is claimed is:
1. A motor control device, comprising:
   a position detecting sensor detecting an angular position of a motor;
   a speed controller controlling a speed of the motor based on the angular position of the motor detected by the position detecting sensor;
   a temperature estimation component that estimates a temperature of the motor from a current command value or a torque command value and, when the estimated temperature reaches a threshold, outputs a current cutoff signal to a current controller that cuts off passage of current to the motor; and an operational state determination component determining based on the angular position of the motor detected by the position detecting sensor that the motor is in a locked state when the angular position of the motor does not change and that the motor is in a rotating state when the angular position of the motor changes, wherein the temperature estimation component sets the threshold as a first threshold when it is determined by the operational state determination component that the motor is in a rotating state and sets the threshold as a second threshold, which is smaller than the first threshold, when it is determined by the operational state determination component that the motor is in a locked state.

2. A motor control device, comprising:

position detecting means for detecting an angular position of a motor;

speed control means for controlling a speed of the motor based on the angular position of the motor detected by the position detecting means;

temperature estimation means for estimating a temperature of the motor from a current command value or a torque command value calculated by the speed control means;

current control means for cutting off passage of current to the motor when the temperature of the motor estimated by the temperature estimation means reaches a threshold;

operational state determination means for determining based on the angular position of the motor detected by the position detecting means that the motor is in a locked state when the angular position of the motor does not change and that the motor is in a rotating state when the angular position of the motor changes; and threshold change means for setting the threshold as a first threshold when it is determined by the operational state determination means that the motor is in a rotating state and setting the threshold as a second threshold, which is smaller than the first threshold, when it is determined by the operational state determination means that the motor is in a locked state.

3. A motor control method, comprising:

a position detecting process for detecting an angular position of a motor;

a speed control process for controlling a speed of the motor based on the angular position of the motor detected by the position detecting process;

a temperature estimation process for estimating a temperature of the motor from a current command value or a torque command value calculated by the speed control process;

a current control process for cutting off passage of current to the motor when the temperature of the motor estimated by the temperature estimation process reaches a threshold;

an operational state determination process for determining based on the angular position of the motor detected by the position detecting process; that the motor is in a locked state when the angular position of the motor does not change and that the motor is in a rotating state when the angular position of the motor changes; and a threshold change process for setting the threshold as a first threshold when it is determined by the operational state determination process that the motor is in a rotating state and setting the threshold as a second threshold, which is smaller than the first threshold, when it is determined by the operational state determination process that the motor is in a locked state.

* * * * *